(12) United States Patent
Tanaka et al.

(10) Patent No.: US 6,329,825 B1
(45) Date of Patent: Dec. 11, 2001

(54) SENSING APPARATUS HAVING A SENSING BRIDGE CIRCUIT AND A TEMPERATURE DETECTING BRIDGE CIRCUIT FOR DETECTING A PHYSICAL QUANTITY AND A RELATED TEMPERATURE COMPENSATING METHOD

(75) Inventors: Hiroaki Tanaka, Kariya; Inao Toyoda, Okazaki, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/440,886

(22) Filed: Nov. 16, 1999

(30) Foreign Application Priority Data

Nov. 26, 1998 (JP) .................................................. 10-335647

(51) Int. Cl.$^7$ .................................................. G01R 17/02
(52) U.S. Cl. ........................... 324/725; 73/1.88; 73/708; 73/721; 374/143; 324/706; 324/721
(58) Field of Search ................................... 324/600, 725, 324/705, 706, 710, 720, 721; 702/98; 374/143

(56) References Cited

U.S. PATENT DOCUMENTS

| 4,659,235 | * | 4/1987 | Gilmore, Jr. et al. | 374/143 |
| 4,734,873 | * | 3/1988 | Malloy et al. | 702/98 |
| 5,259,248 | * | 11/1993 | Ugai et al. | 73/721 |
| 5,477,196 | * | 12/1995 | Yamauchi et al. | 331/60 |
| 5,532,582 | * | 7/1996 | Egami | 324/130 |
| 5,583,295 | * | 12/1996 | Nagase et al. | 73/708 |
| 5,764,541 | | 6/1998 | Hermann et al. | 364/571.01 |
| 5,854,421 | * | 12/1998 | Yamamoto | 73/1.88 |

FOREIGN PATENT DOCUMENTS

| 58-114199 | 7/1983 | (JP) . |
| 59-41134 | 10/1984 | (JP) . |
| 4-19494 | 3/1992 | (JP) . |
| 9-113310 | 5/1997 | (JP) . |
| 9-318403 | 12/1997 | (JP) . |
| 10-281912 | 10/1998 | (JP) . |
| 11-64135 | 3/1999 | (JP) . |

* cited by examiner

Primary Examiner—Vinh P. Nguyen
Assistant Examiner—Paresh Patel
(74) Attorney, Agent, or Firm—Pillsbury Winthrop LLP

(57) ABSTRACT

A pressure detecting bridge circuit produces a sensor signal Sd. A temperature detecting bridge circuit produces a temperature signal St. A reference voltage generating circuit produces a reference signal Sa. An analog multiplexer processes these signals Sd, St and Sa in a time-divisional manner. A differential amplification circuit and an A/D conversion circuit are commonly used to obtain the digital data corresponding to the sensor signal Sd, the temperature signal St and the reference signal Sa. The temperature detecting bridge circuit includes reference resistance elements. By adjusting the design resistance values of the reference resistance elements, the variation width of the sensor signal Sd in a pressure measuring range of the pressure detecting bridge circuit is substantially equalized in advance with the variation width of the temperature signal St in a temperature measuring range of the temperature detecting bridge circuit.

16 Claims, 7 Drawing Sheets

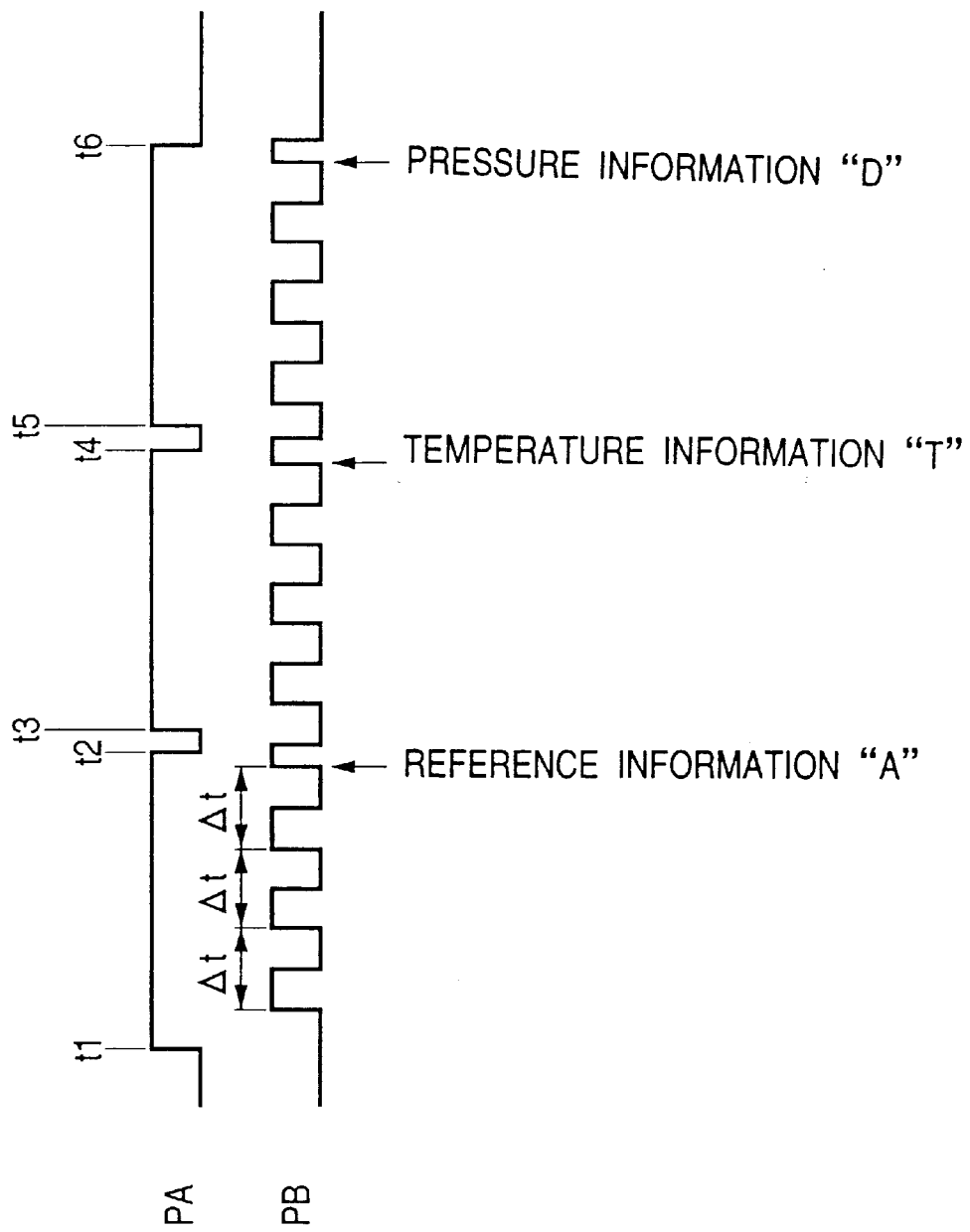

SENSING APPARATUS HAVING A SENSING BRIDGE CIRCUIT AND A TEMPERATURE DETECTING BRIDGE CIRCUIT FOR DETECTING A PHYSICAL QUANTITY AND A RELATED TEMPERATURE COMPENSATING METHOD

BACKGROUND OF THE INVENTION

The present invention relates to a sensing apparatus including a sensing bridge circuit for generating a sensor signal having the voltage level representing a detected physical quantity and a temperature detecting bridge circuit for correcting the temperature characteristics of the sensing bridge circuit.

For example, a conventional pressure sensing apparatus includes a diaphragm and a gauge resistor formed on a semiconductor chip. In this kind of conventional pressure sensing apparatus, the temperature compensation for adjusting the sensitivity or the offset is usually performed through an analog correcting circuit. Numerous operational amplifiers are required. In general, downsizing the operational amplifier is difficult. In other words, the conventional sensing apparatus relying on the operational amplifiers needs to prepare a semiconductor chip having a large chip area, and therefore cannot reduce the overall size.

Furthermore, due to the aging phenomenon which reduces the stress of the protective film covering the chip surface, the offset of each operational amplifier may deviate from its initial value or the pair ratio of resistors associated with each operational amplifier may also deviate from its initial value. In such cases, it is difficult to prevent the circuit constants of each section from variously changing or fluctuating. As a result, the sensing accuracy of the finally obtained pressure value is deteriorated.

SUMMARY OF THE INVENTION

An object of the present invention is to provide a sensing apparatus which is capable of improving the sensing accuracy in this kind of sensing apparatus.

In order to accomplish this and other related objects, the present invention provides a sensing apparatus which comprises a sensing bridge circuit and a temperature detecting bridge circuit. The sensing bridge circuit includes a plurality of resistance elements for generating a sensor signal having the voltage level responsive to a detected physical quantity. The temperature detecting bridge circuit includes at least one temperature-sensing resistance element having a predetermined temperature coefficient and at least one reference resistance element having a temperature coefficient equal to or nearly equal to 0 for generating a temperature signal having the voltage level responsive to a temperature of the sensing bridge circuit. A signal selecting circuit is provided for selectively outputting the sensor signal and the temperature signal. And, an amplification circuit is provided for amplifying the signals successively outputted from the signal selecting circuit.

Furthermore, to improve the sensing accuracy, a variation width of the sensor signal in a physical quantity measuring range of the sensing bridge circuit is substantially equalized in advance with a variation width of the temperature signal in a temperature measuring range of the temperature detecting bridge circuit.

Preferably, the sensing bridge circuit and the temperature detecting bridge circuit are formed on a same semiconductor substrate.

Preferably, the variation width of the sensor signal in the physical quantity measuring range of the sensing bridge circuit is substantially equalized with the variation width of the temperature signal in the temperature measuring range of the temperature detecting bridge circuit by adjusting a design resistance value of at least one reference resistance element.

Preferably, the temperature detecting bridge circuit has at least one trimming resistor to adjust the variation width of the temperature signal produced from the temperature detecting bridge circuit.

Preferably, the sensing apparatus further comprises an A/D conversion circuit which converts the amplified signals of the amplification circuit into digital data corresponding to the sensor signal and the temperature signal. In this case, a signal processing means is provided for performing the digital calculating processing based on the digital data produced from the A/D conversion circuit to calculate the detected physical quantity corresponding to the sensor signal and correct the detected physical quantity in accordance with the temperature signal.

Preferably, the sensing apparatus further comprises a reference voltage generating circuit for generating a reference signal having a constant voltage level irrespective of the detected physical quantity and the temperature of the sensing bridge circuit. The reference signal is selected by the signal selecting circuit and supplied to the amplification circuit. In this case, the A/D conversion circuit converts the amplified signals of the amplification circuit into digital data corresponding to the sensor signal, the temperature signal and the reference signal. A signal processing means is provided for performing the digital calculating processing based on the digital data produced from the A/D conversion circuit to calculate the detected physical quantity corresponding to the sensor signal and correct the detected physical quantity in accordance with the temperature signal and the reference signal.

Preferably, the A/D conversion circuit includes a ring-gate delay circuit comprising a plurality of inverting circuits connected in a ring pattern and having an inverting operation time varying in accordance with a power source voltage. Each of the amplified signals, when serving as the power source voltage of the ring-gate delay circuit, is converted into digital data based on a pulse signal circulation frequency when a pulse signal is entered into the ring-gate delay circuit.

Preferably, a zero-crossing point of the sensor signal in the physical quantity measuring range of the sensing bridge circuit is substantially equalized in advance with a zero-crossing point of the temperature signal in the temperature measuring range of the temperature detecting bridge circuit. In this case, the trimming resistor in the temperature detecting bridge circuit is used to adjust the zero-crossing point of the temperature signal produced from the temperature detecting bridge circuit.

Preferably, a power source for supplying electric power to the sensing apparatus is a battery.

Another aspect of the present invention provides a related method for adjusting temperature characteristics of the above sensing apparatus.

Namely, this method comprises the step of substantially equalizing the variation width of the sensor signal in the physical quantity measuring range of the sensing bridge circuit with the variation width of the temperature signal in the temperature measuring range of the temperature detecting bridge circuit.

The adjustment of the variation width of the output signal from the bridge circuit can be done by adequately determining a design resistance value of the at least one reference resistance element. The trimming resistor in the temperature detecting bridge circuit can be also used to adjust the variation width of the output signal from the bridge circuit.

Preferably, this method further comprises the step of substantially equalizing the zero-crossing point of the sensor signal in the physical quantity measuring range of the sensing bridge circuit with the zero-crossing point of the temperature signal in the temperature measuring range of the temperature detecting bridge circuit. The zero-point of the temperature signal produced from the temperature detecting bridge circuit is controlled by trimming at least one trimming resistor provided in the temperature detecting bridge circuit.

BRIEF DESCRIPTION OF THE DRAWINGS

The above and other objects, features and advantages of the present invention will become more apparent from the following detailed description which is to be read in conjunction with the accompanying drawings, in which:

FIG. 4 is a timing chart showing the operation of the semiconductor pressure sensing apparatus in accordance with the preferred embodiment of the present invention;

DESCRIPTION OF THE PREFERRED EMBODIMENT

Figure 1:
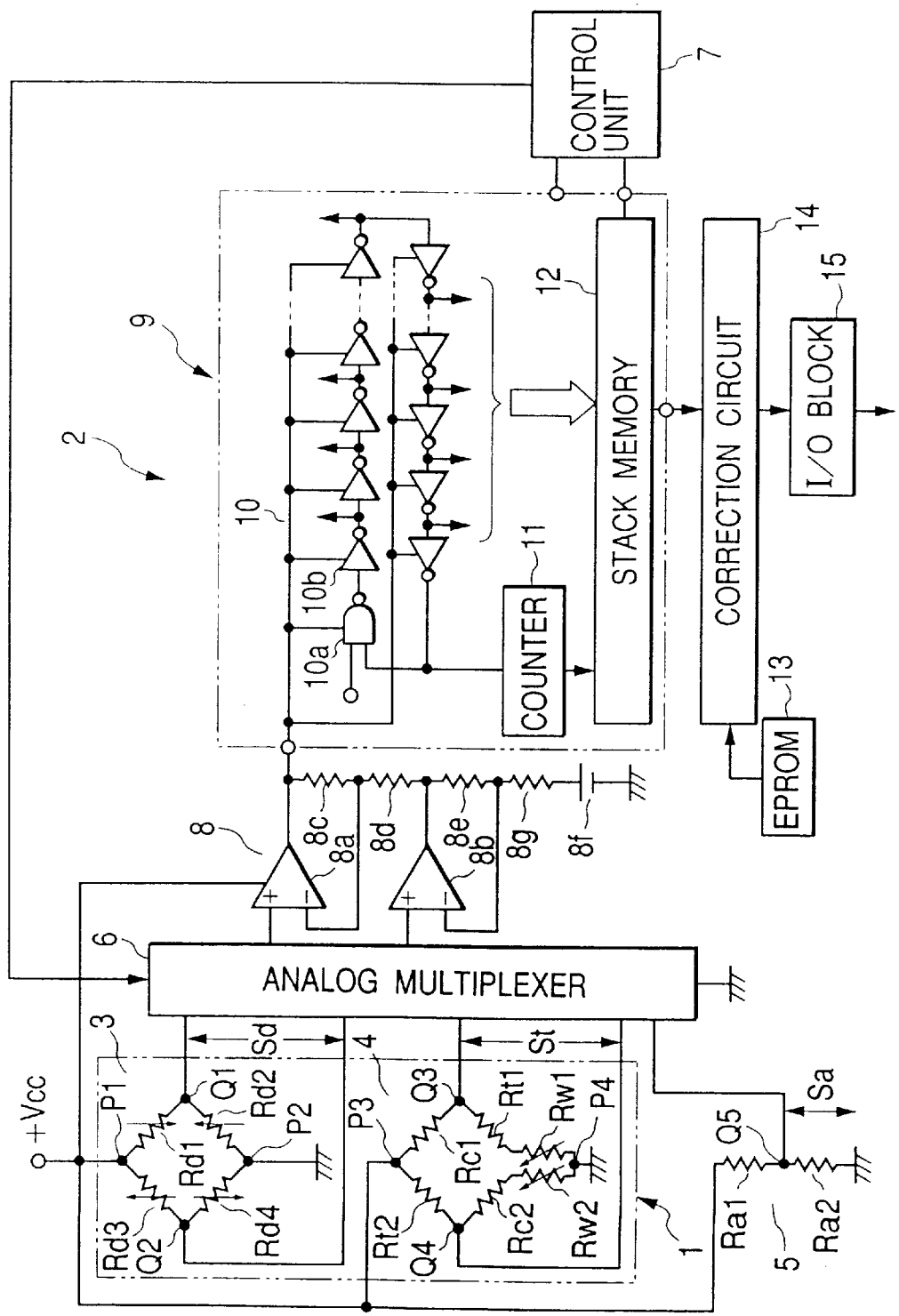
FIG. 1 is a circuit diagram showing an overall arrangement of a semiconductor pressure sensing apparatus in accordance with a preferred embodiment of the present invention.

A semiconductor pressure sensing apparatus in accordance with a preferred embodiment of the present invention will be explained hereinafter with reference to attached drawings. Identical parts are denoted by the same reference numerals throughout the views.

Fundamental Arrangement

The present invention is based on a circuit arrangement including a sensing circuit for generating an analog sensing signal, an A/D conversion circuit for converting the analog sensing signal into digital data, and a signal processing circuit for processing the digital data. For example, a pressure sensing circuit can be arranged in the following manner.

A pressure detecting bridge circuit, including a plurality of resistance elements, is formed on a semiconductor chip having a piezoelectric-resistance coefficient. The pressure detecting bridge circuit generates a sensor signal having the voltage level representing a detected pressure value. A temperature detecting bridge circuit, which is also formed on the same semiconductor chip, generates a temperature signal having the voltage level representing the temperature of the pressure detecting bridge circuit. The temperature detecting bridge circuit comprises at least one temperature-sensitive resistance element having a predetermined temperature coefficient and at least one reference resistance element having a temperature coefficient equal to or nearly equal to 0.

A reference voltage generating circuit, constituted by diffused resistors, generates a reference signal having a constant voltage level irrespective of the pressure acting on the pressure detecting bridge circuit and the temperature of this bridge circuit. The reference voltage generating circuit can be formed on the semiconductor chip of the pressure detecting bridge circuit. In addition, an analog multiplexer is provided to selectively output the sensor signal, the temperature signal and the reference signal. A differential amplification circuit, constituted by operational amplifiers, amplifies the signals successively outputted from the analog multiplexer. An A/D conversion circuit converts the amplified signals of the differential amplification circuit into digital data corresponding to the sensor signal, the temperature signal and the reference signal. And, a correcting circuit is provided for performing the digital calculating processing to calculate the detected pressure value corresponding to the sensor signal and correct it in accordance with the temperature signal and the reference signal.

With this arrangement, the analog multiplexer processes the sensor signal, the temperature signal and the reference signal in the time-divisional manner. The same differential amplification circuit and the same A/D conversion circuit are used to obtain a plurality of digital data corresponding to the sensor signal, the temperature signal and the reference signal. Through the correcting calculation (i.e., digital calculation) performed based on the thus obtained digital data, it becomes possible to perform the temperature compensation for adjusting the sensitivity, thereby accurately detecting the pressure value.

Accordingly, this sensing apparatus does not require numerous operational amplifiers which are conventionally required. The overall circuit size can be downsized. Furthermore, the differential amplification circuit is commonly used to amplify all of the sensor signal, the temperature signal and the reference signal. There is no necessity of providing numerous differential amplification circuits each requiring a relatively large circuit area. This is also advantageous in reducing the overall circuit size.

Furthermore, the sensor signal, the temperature signal, and the reference signal are all processed in the same analog circuit (i.e., the analog multiplexer, the differential amplification circuit, and the A/D conversion circuit), and are finally converted into the digital data. Using the common analog circuit for processing a plurality kinds of signals is effective to cancel any drift components of respective signals caused due to variation or fluctuation of circuit constants in the signal transmission path. As a result, it becomes possible to remove the adverse influence derived from the durability deterioration. It becomes possible to adequately maintain the accuracy of the finally obtained pressure value for a long time.

However, according to the operational amplifier constituting the differential amplification circuit, the relationship between the output voltage and the input voltage (i.e., amplification characteristics) is nonlinear. If the voltage variation width of the sensor signal produced from the pressure detecting bridge circuit is different from the voltage variation width of the temperature signal produced from the temperature detecting bridge circuit, an error component between the sensor signal and the temperature signal will expand. In other words, the accuracy of the finally obtained pressure value will be worsened.

The present invention has an object to reduce the error in the finally obtained physical value in performing the temperature compensation based on a voltage signal (i.e., temperature signal) representing the temperature of the sensing bridge circuit.

Preferred Embodiment

FIG. 1 shows an overall circuit arrangement of a semiconductor pressure sensing apparatus in accordance with a preferred embodiment of the present invention. In FIG. 1, the semiconductor pressure sensing apparatus comprises a sensing section 1 which detects the pressure and a signal processing section 2 which processes the output of the sensing portion 1. The sensing section 1 and the signal processing section 2 are formed separately on different semiconductor chips. It is of course possible to form both of the sensing section 1 and the signal processing section 2 on a same semiconductor chip.

The sensing section 1 is made of a semiconductor chip (e.g., silicon monocrystal substrate) having a large piezoelectric-resistance coefficient. The sensing section 1 comprises a pressure detecting bridge circuit 3 and a temperature detecting bridge circuit 4. The pressure detecting bridge circuit 3 detects a pressure applied to this circuit. The temperature detecting bridge circuit 4 detects the temperature of the pressure detecting bridge circuit 3.

More specifically, the pressure detecting bridge circuit 3 comprises a total of four diffused resistance elements Rd1, Rd2, Rd3 and Rd4 which are formed on a diaphragm of a semiconductor chip and arranged in a full bridge connection pattern. The resistance value of each of resistance elements Rd1, Rd2, Rd3 and Rd4 varies in response to an applied pressure. In FIG. 1, an up arrow indicates that the resistance value increases in response to an applied pressure. A down arrow indicates that the resistance value decreases in response to the applied pressure. An input terminal P1 of pressure detecting bridge circuit 3 receives a constant voltage applied from a constant-voltage power source terminal +Vcc. Another input terminal P2 of pressure detecting bridge circuit 3 is grounded.

Accordingly, one output terminal Q1 (i.e., a joint point of resistance elements Rd1 and Rd2) of pressure detecting bridge circuit 3 has an electric potential increasing in proportion to the applied pressure. The other output terminal Q2 (i.e., a joint point of resistance elements Rd3 and Rd4) of pressure detecting bridge circuit 3 has an electric potential decreasing in proportion to the applied pressure. Thus, a sensor signal Sd having the voltage level corresponding to the applied pressure is detectable between two output terminals Q1 and Q2. The sensor signal Sd varies in response to the temperature of the pressure detecting bridge circuit 3. The temperature detecting bridge circuit 4 obtains the data required for removing such a temperature drift component.

The temperature detecting bridge circuit 4 comprises a total of four resistance elements Rt1, Rt2, Rc1 and Rc2 which are arranged in a full bridge connection pattern. Each of resistance elements Rt1 and Rt2 is made of a diffused resistor manufactured in the same manner as the diffused resistance elements Rd1, Rd2, Rd3 and Rd4 of the pressure detecting bridge circuit 3, and has a temperature coefficient of approximately 1,500 to 1,700 ppm/° C. Each of resistance elements Rc1 and Rc2, serving as a reference resistor, is made of a non-sensitive material, such as CrSi, which has a temperature coefficient equal to or nearly equal to 0.

The temperature detecting bridge circuit 4 comprises two trimming resistors Rw1 and Rw2 which are respectively formed by a thin film resistor on the semiconductor chip.

More specifically, a serial circuit consisting of the reference resistance element Rc1, the temperature-sensitive resistance element Rt1 and the trimming resistor Rw1 is connected between the input terminals P3 and P4. Another serial circuit consisting of the temperature-sensitive resistance element Rt2, the reference resistance element Rc2 and the trimming resistor Rw2 is also connected between the input terminals P3 and P4. The joint point of the reference resistance element Rc1 and the temperature-sensitive resistance element Rt1 serves as an output terminal Q3. The joint point of the temperature-sensitive resistance element Rt2 and the reference resistance element Rc2 serves as another output terminal Q3. The input terminal P3 of temperature detecting bridge circuit 4 receives a constant voltage applied from the constant-voltage power source terminal +Vcc. Another input terminal P4 of temperature detecting bridge circuit 4 is grounded.

Accordingly, one output terminal Q3 of temperature detecting bridge circuit 4 has an electric potential increasing in proportion to a detected temperature. The other output terminal Q4 of temperature detecting bridge circuit 4 has an electric potential decreasing in proportion to the detected temperature. Thus, a temperature signal St having the voltage level corresponding to the temperature of the pressure detecting bridge circuit 3 is detectable between two output terminals Q3 and Q4.

The voltage level of the temperature signal St and the variation width of the temperature signal St are finely adjustable by changing the resistance values of the trimming resistors Rw1 and Rw2.

The signal processing section 2 comprises the following circuit elements formed on a semiconductor chip.

A reference voltage generating circuit 5 comprises diffused resistance elements Ra1 and Ra2 serially connected between the constant-voltage power source terminal +Vcc and the ground terminal. The resistance elements Ra1 and Ra2 have exactly the same temperature coefficient. The reference voltage generating circuit 5 has an output terminal Q5 (i.e., a joint point of resistance elements Ra1 and Ra2) which outputs a reference signal Sa having a constant voltage level irrespective of the pressure acting on the pressure detecting bridge circuit 3 and the temperature of the pressure detecting bridge circuit 3. It is possible to form the reference voltage generating circuit 5 on the semiconductor chip of the sensing section 1.

An analog multiplexer 6 selectively outputs the sensor signal Sd obtained from the pressure detecting bridge circuit 3, the temperature signal St obtained from the temperature detecting bridge circuit 4, and the reference signal Sa obtained from the reference voltage generating circuit 5 in response to a select signal supplied from a control unit 7.

A high input-impedance differential amplification circuit 8 comprises two CMOS operational amplifiers 8a and 8b and three resistors 8c, 8d and 8e. The differential amplification circuit 8 amplifies the output signals successively outputted from the analog multiplexer 6, and sends the amplified signals to an A/D conversion circuit 9. The differential amplification circuit 8 is associated with a constant-voltage power source 8f and a resistor 8g which cooperate to maintain the amplified output voltage at a higher level. Meanwhile, the electric power for differential amplification circuit 8 is supplied from the constant-voltage power source terminal +Vcc.

The A/D conversion circuit 9 comprises a ring-gate delay circuit 10, a circulation frequency counter 11, and a stack memory 12. The ring-gate delay circuit 10 comprises a NAND gate circuit 10a and even inverters 10b connected in a ring pattern. The NAND gate circuit 10a and each inverter 10b have an inverting operation time varying in accordance with the power source voltage. The circulation frequency counter 11 counts a circulation frequency (i.e., a number of times of complete circulation) of a pulse signal in the ring-gate delay circuit 10. The stack memory 12 stores the count value of the circulation frequency counter 11 as upper bits and stores the output of each inverter 10b as lower bits.

The A/D conversion circuit 9 operates in the following manner. FIG. 4 shows a pulse signal PA applied to the NAND gate 10a in the ring-gate delay circuit 10. The NAND gate 10a and each inverter 10b starts an inverting operation successively at the speed corresponding to the power source voltage. The signal circulating operation is continuously performed during an ON duration of the pulse signal PA. Meanwhile, the stack memory 12 receives real-time binary data representing the circulation frequency of the pulse signal. Each build-up of a pulse signal PB shown in FIG. 4 latches the stack memory 12. The pulse signal PB is used to obtain a predetermined sampling period Δt ( e.g., equal to or less than 100 μsec). Based on a difference between respective latch data in the stack memory 12, binary data is obtained as a value representing the power source voltage supplied to the inverter 10b.

In this case, the power source voltage is applied from the differential amplification circuit 8 to the NAND gate 10a and each inverter 10b in the ring-gate delay circuit 10. Thus, the A/D conversion circuit 9 converts an output signal of the differential amplification circuit 8 into digital data. In other words, the sensor signal Sd, the temperature signal St and the reference signal Sa, selectively outputted from the analog multiplexer 6, are converted into digital data.

The digital data produced from the A/D conversion circuit 9 are referred to in the following manner:

pressure information D represents the digital data corresponding to the sensor signal Sd;

temperature information T represents the digital data corresponding to the temperature signal St; and reference information A represents the digital data corresponding to the reference signal Sa.

The pressure information D is defined by the following equation ① based on the voltage P applied to the pressure detecting bridge circuit 3.

$$D=\{(ct+d)\times P+et+f\}\times \beta(t) \qquad (1)$$

where "t" represents a temperature of the pressure detecting bridge circuit 3, "c" represents a temperature coefficient in the sensitivity of the pressure detecting bridge circuit 3, "d"represents a room temperature sensitivity of the pressure detecting bridge circuit 3, "e" represents a temperature coefficient of an offset of a detected pressure value, and "f" represents a room temperature offset value of the detected pressure value.

Furthermore, β(t) is a nonlinear term which is dependent on the temperature characteristics of the differential amplification circuit 8 and the temperature characteristics of the delay time of the ring-gate delay circuit 10. In other words, β(t) is a factor causing deterioration in the sensitivity of pressure detection.

To solve "" from the equation ①, it is necessary to obtain "t" and remove β(t). To this end, the temperature information T is obtained from the temperature detecting bridge circuit 4 and the reference information A is obtained from the reference voltage generating circuit 5.

The following equation ② represents the relationship between the temperature information T and the temperature "t" of the pressure detecting bridge circuit 3.

$$T=(at+b)\times\beta(t) \qquad (2)$$

where "a" represents a temperature coefficient of a detected temperature value, and "b" represents a room temperature offset value of the detected temperature value.

To obtain the reference information A, the differential amplification circuit 8 amplifies the reference signal Sa and the A/D conversion circuit 9 converts the amplified signal into digital data. The reference signal Sa has a constant voltage level irrespective of the pressure acting on the pressure detecting bridge circuit 3 and the temperature of the pressure detecting bridge circuit 3. Accordingly, the following relationship ③ is expressed.

$$A=\beta(t) \qquad (3)$$

Accordingly, the following equations are obtained by erasing β(t) from the above equations ①, ②and ③.

$$T/A=at+b \qquad (4)$$

$$D/A=(ct+d)\times P+et+f \qquad (5)$$

By solving "P" from the above equations ④ and ⑤, the following equation is obtained.

$$P=\{(T/A-b)\times(-e/a)+D/A-f\}/\{(T/A-b)\times c/a+d\} \qquad (6)$$

An EPROM 13 stores the coefficient values of "a", "b", "c", "d", "e" and "f" which are required for calculating the pressure "P" defined by the equation ⑥.

A correction circuit 14 performs the calculation for obtaining the pressure P defined by the equation ⑥ in response to a command sent from the control unit 7, with reference to the pressure information D, temperature information T and reference information A read from the stack memory 12 in addition to the coefficient values (a, b, c, d, e, f) read from the EPROM 13. The calculation result in the correction circuit 14 is outputted through an I/O block 15 as pressure data representing the detected pressure of the sensing section 1.

Figure 5:
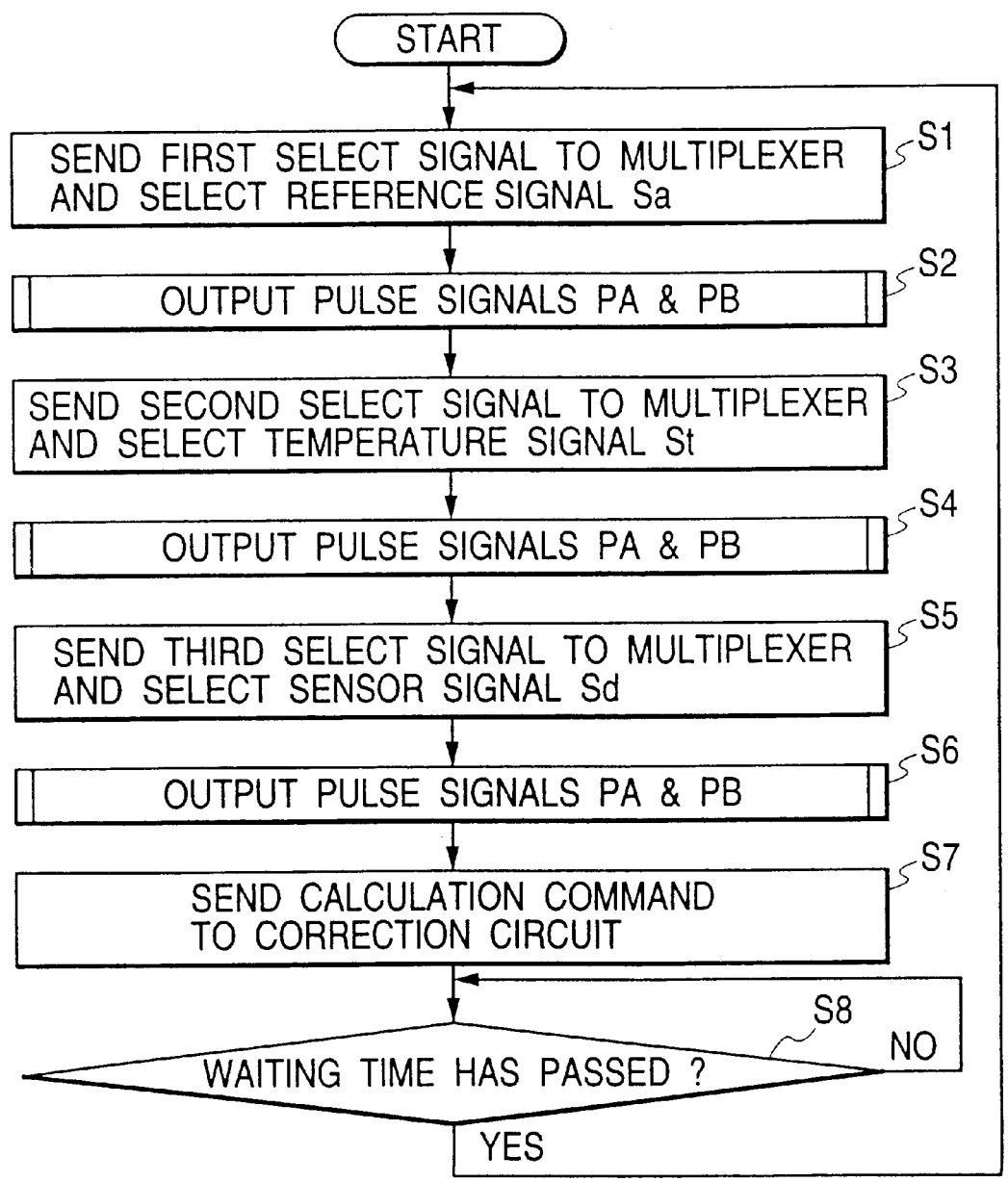
FIG. 5 is a flowchart showing the control procedure performed in a control unit of the semiconductor pressure sensing apparatus in accordance with the preferred embodiment of the present invention.

FIG. 5 is a flowchart showing a control procedure performed in the control unit 7 in accordance with the preferred embodiment of the present invention.

First, in step S1, the control unit 7 sends a first select signal to the analog multiplexer 6. In response to the first select signal, the multiplexer 6 selects the reference signal Sa supplied from the reference voltage generating circuit 5. The differential amplification circuit 8 amplifies the reference signal Sa and produces a voltage signal corresponding to the amplified reference signal Sa. This voltage signal serves as a first signal to be processed in the AID conversion circuit 9. Namely, the first signal is applied to the ring-gate delay circuit 10 in the A/D conversion circuit 9.

Thereafter, in step S2, the control unit 7 executes a control routine for outputting the pulse signals PA and PB to the A/D conversion circuit 9. More specifically, in the step S2, the control unit 7 generates the pulse signal PA during a time period from t1 to t2 as shown in FIG. 4. Meanwhile, after the time t1, the control unit 7 generates the pulse signal PB which rises four times by the time t2 as shown in FIG. 4.

With such generation of pulse signals PA and PB, the first signal circulates in the ring-gate delay circuit 10 continuously during an on-time of the pulse signal PA. Each build-up of the pulse signal PB latches the stack memory 12. The control unit 7 obtains a difference between latch data, e.g., a difference between the latch data at the third build-up timing and the latch data at the fourth build-up timing. Then, the control unit 7 obtains the digital data representing the reference information A which is dependent on the first signal (i.e., amplified reference signal Sa) supplied from the differential amplification circuit 8.

Then, in step S3, the control unit 7 sends a second select signal to the analog multiplexer 6. In response to the second select signal, the multiplexer 6 selects the temperature signal St supplied from the temperature detecting bridge circuit 4.The differential amplification circuit 8 amplifies the temperature signal St and produces a voltage signal corresponding to the amplified temperature signal St. This voltage signal serves as a second signal to be processed in the A/D conversion circuit 9. Namely, the second signal is applied to the ring-gate delay circuit 10 in the A/D conversion circuit 9.

Thereafter, in step S4, the control unit 7 executes the control routine for outputting the pulse signals PA and PB. More specifically, in the step S4, the control unit 7 generates the pulse signal PA during a time period from t3 to t4 as shown in FIG. 4. Meanwhile, after the time t3, the control unit 7 generates the pulse signal PB which rises several times by the time t4 as shown in FIG. 4.

With such generation of pulse signals PA and PB, the second signal circulates in the ring-gate delay circuit 10 continuously during an on-time of the pulse signal PA. Each build-up of the pulse signal PB latches the stack memory 12. The control unit 7 obtains a difference between latch data. Then, the control unit 7 obtains the digital data representing the temperature information T which is dependent on the second signal (i.e., amplified temperature signal St) supplied from the differential amplification circuit 8.

Then, in step S5, the control unit 7 sends a third select signal to the analog multiplexer 6. In response to the third select signal, the multiplexer 6 selects the sensor signal Sd supplied from the pressure detecting bridge circuit 3.The differential amplification circuit 8 amplifies the sensor signal Sd and produces a voltage signal corresponding to the amplified sensor signal Sd. This voltage signal serves as a third signal to be processed in the A/D conversion circuit 9. Namely, the third signal is applied to the ring-gate delay circuit 10 in the A/D conversion circuit 9.

Thereafter, in step S6, the control unit 7 executes the control routine for outputting the pulse signals PA and PB. More specifically, in the step S6, the control unit 7 generates the pulse signal PA during a time period from t5 to t6 as shown in FIG. 4. Meanwhile, after the time t5, the control unit 7 generates the pulse signal PB which rises several times by the time t6 as shown in FIG. 4.

With such generation of pulse signals PA and PB, the third signal circulates in the ring-gate delay circuit 10 continuously during an on-time of the pulse signal PA. Each build-up of the pulse signal PB latches the stack memory 12. The control unit 7 obtains a difference between latch data. Then, the control unit 7 obtains the digital data representing the pressure information D which is dependent on the third signal (i.e., amplified sensor signal Sd) supplied from the differential amplification circuit 8.

According to this arrangement, the stack memory 12 produces three kinds of digital data in respective pulse output routines of steps S2, S4 and S6. It is therefore possible to obtain an average of there digital data (i.e., reference information A, temperature information T and pressure information D).

Then, in step S7, the control unit 7 generates a calculation command to the correction circuit 14. In response to this calculation command, the correction circuit 14 performs the calculation for obtaining the pressure P defined by the equation (6), with reference to the pressure information D, the temperature information T and the reference information A read from the stack memory 12 in addition to the coefficient values (a, b, c, d, e, f) read from the EPROM 13. The calculation result in the correction circuit 14 is outputted through the I/O block 15 as pressure data representing the detected pressure of the sensing section 1.

Then, in step S8, the control unit 7 checks whether a predetermined time (i.e., a waiting time) has passed or not. When the judgement result is NO in the step S8, the control unit 7 repeats the judgement of step S8 until the waiting time has passed. When the judgement result is YES in the step S8, the control flow returns to the step S1. Thus, the processing procedure of steps S1 to S7 is cyclically performed at predetermined time intervals.

According to the above-described semiconductor pressure sensing apparatus, the variation width of the sensor signal Sd in the pressure measuring range of the pressure detecting bridge circuit 3 is substantially equalized in advance with the variation width of the temperature signal St in the temperature measuring range of the temperature detecting bridge circuit 4. Such setting is done in the manufacturing process of the semiconductor pressure sensing apparatus.

FIGS. 3A to 3H sequentially shows the manufacturing process of the semiconductor pressure sensing apparatus in accordance with the preferred embodiment of the present invention. The substrate structure disclosed in FIGS. 3A to 3H corresponds to the reference resistance element Rc1 and the temperature-sensing resistance element Rt1.

Figure 3A:
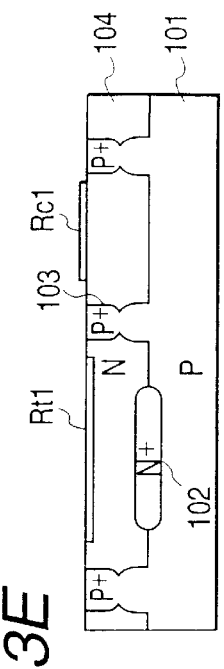
FIGS. 3A to 3H are cross-sectional views sequentially showing the manufacturing process of the semiconductor pressure sensing apparatus.

As shown in FIG. 3A, a P-type monocrystalline silicon substrate 101 is prepared as a semiconductor substrate. An $N^+$ diffusion layer 102a, which finally serves as an $N^+$ buried or embedded layer 102, is formed at a predetermined position on this monocrystalline silicon substrate 101. Similarly, a plurality of $P^+$ diffusion layers 103a, each finally serving as an isolated diffusion layer 103, are formed at a predetermined position spaced from the $N^+$ diffusion layer 102a on the P-type monocrystalline silicon substrate 101. The diffusion process for forming these layers 102 and 103 is performed on a thermal oxide film formed on the monocrystalline silicon substrate 101 by utilizing a conventionally known photo-etching mask. FIG. 3A shows a condition where the photo-etching mask is removed. Various masks are utilized in the processes explained hereinafter. However, these masks are conventionally known and therefore will not be explained in detail.

Figure 3B:
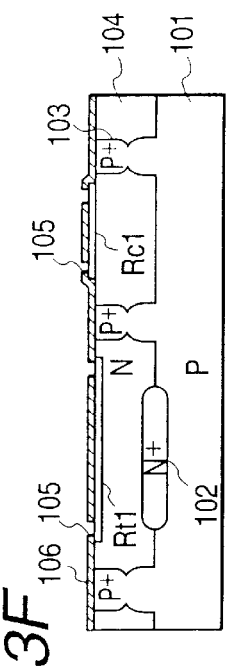
Figure 3C:
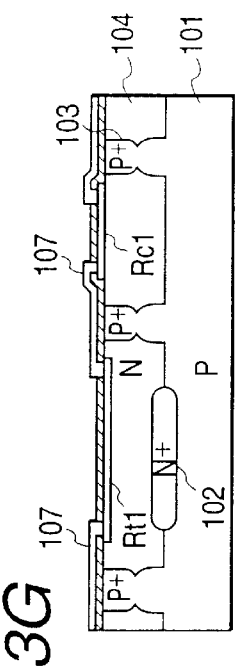

Next, as shown in FIG. 3B, an N type epitaxial layer 104 grows on the monocrystalline silicon substrate 101. Then, as shown in FIG. 3C, a P type isolated diffusion layer 103 is formed in this N type epitaxial layer 104 at each position corresponding to the $P^+$ diffusion layer 103a.

Figure 3D:
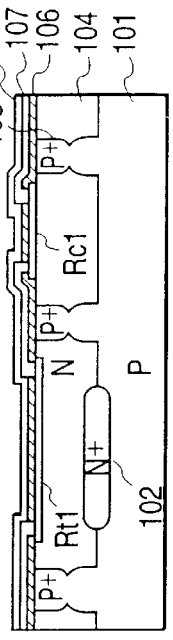
Figure 3E:
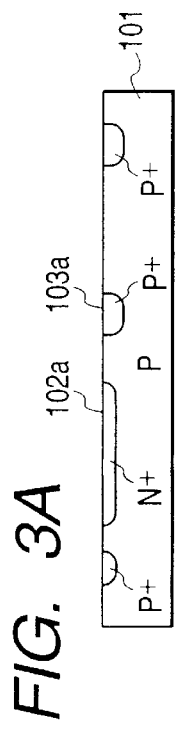

Thereafter, as shown in FIG. 3D, each of the resistance elements Rd1 to Rd4 and the temperature-sensitive resistance elements Rt1 and Rt2 (although only the temperature-sensitive resistance element Rt1 is disclosed in the drawing)

is formed at a predetermined position on the epitaxial layer 104 by diffusing the P type impurity. Then, each of the reference resistance elements Rc1 and Rc2 (although only the reference resistance element Rc1 is disclosed in the drawing) is formed at a predetermined position on the epitaxial layer 104 by sputtering the CrSi thin film.

Figure 3F:
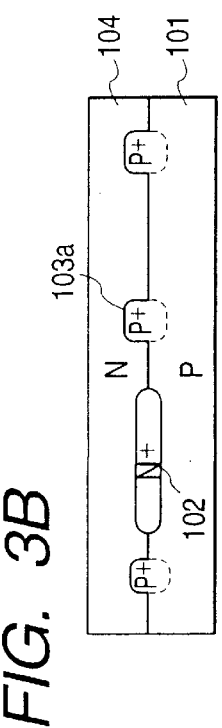

Furthermore, as shown in FIG. 3F, an entire surface of the epitaxial layer, except for a plurality of contact holes 105 arranged at a predetermined pattern, is covered by an oxide film 106 by utilizing the thermal oxidation. The positions of the contact holes 105 correspond to respective ends of the resistance elements Rd1 to Rd4, the temperature-sensitive resistance elements Rt1, Rt2 and the reference resistance elements Rc1, Rc2. Each contact hole 105 serves as a lead terminal of the corresponding resistance element.

Figure 3G:
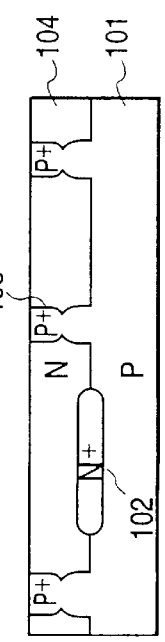
Figure 3H:
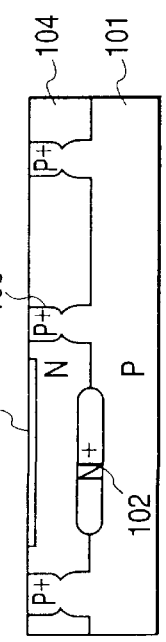

Then, as shown in FIG. 3G, a wiring pattern 107 of an aluminum thin film is formed on the oxide film 106 by the sputtering. The wiring pattern 107 is connected to respective contact holes 105 to the resistance elements Rd1 to Rd4, the temperature-sensitive resistance elements Rt1, Rt2 and the reference resistance elements Rc1, Rc2. Furthermore, as shown in FIG. 3H, a protective film 108 made of a PSG film is entirely formed on the upper surface of the wiring pattern 107 and the oxide film 106. Although not shown in the drawing, the protective film 108 has bonding openings at predetermined positions.

The resistance values of resistance elements Rd1 to Rd4, temperature-sensitive resistance elements Rt1, Rt2 and reference resistance elements Rc1, Rc2 are determined considering the largeness and the configuration of the corresponding diffused resistance region or the corresponding CrSi thin film as well as the position of the corresponding contact hole 105. In this case, the variation width of the sensor signal Sd in the pressure measuring range of the pressure detecting bridge circuit 3 is substantially equalized in advance with the variation width of the temperature signal St in the temperature measuring range of the temperature detecting bridge circuit 4 by adjusting the design resistance values of the reference resistance elements Rc1 and Rc2 made of a CrSi thin film.

Figure 2:
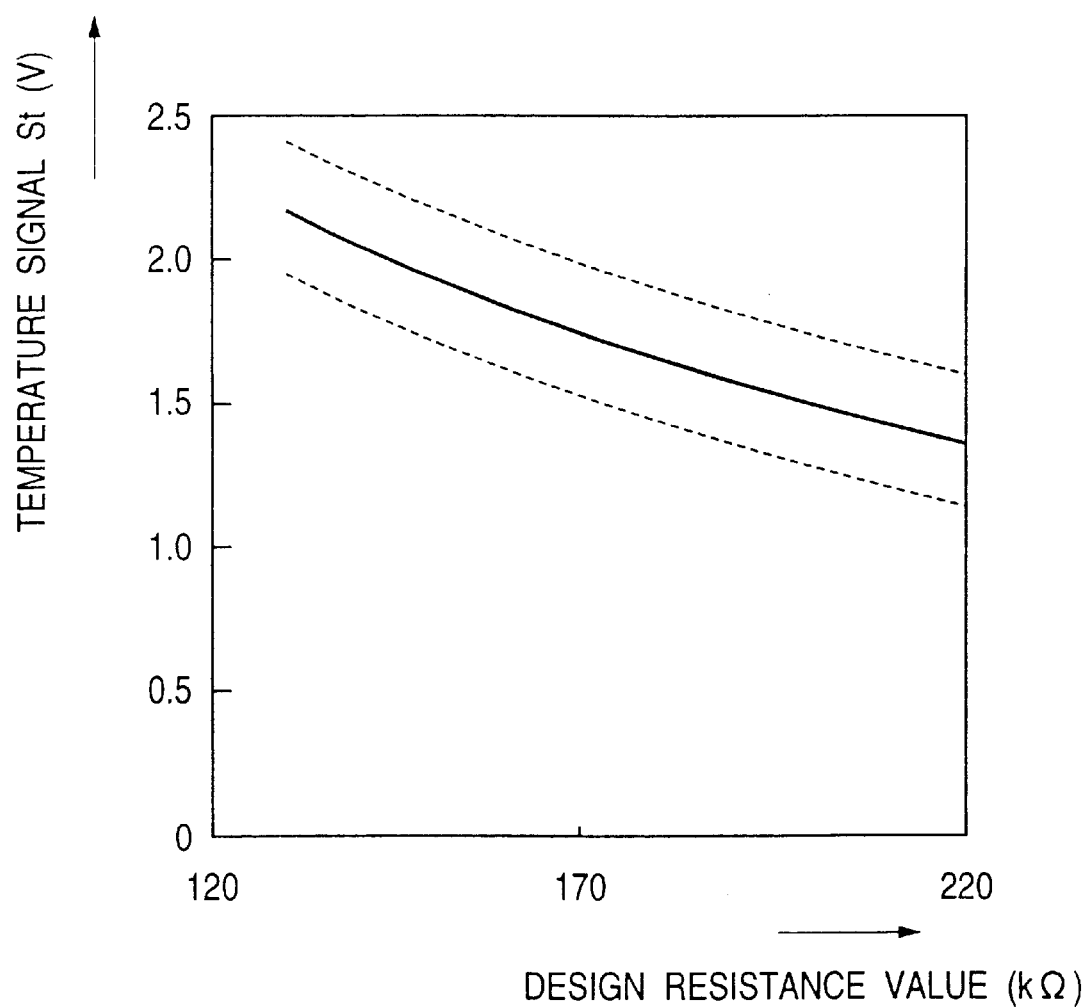
FIG. 2 is a graph showing the relationship between a design resistance value of a reference resistance element and a temperature signal.

More specifically, according to the temperature detecting bridge circuit 4 of the above-described embodiment, the voltage level of the temperature signal St decreases with increasing resistance value of the reference resistance elements Rc1 and Rc2 as shown in FIG. 2. Thus, by adjusting the design values of the reference resistance elements Rc1 and Rc2, the variation width of the sensor signal Sd can be equalized with the variation width of the temperature signal St. However, due to an error component caused in a practical circuit, the voltage level of the temperature signal St is inevitably deviated from the design value (shown by a solid line in FIG. 2) toward an upper or lower direction as shown by dotted lines in FIG. 2. Thus, one of the trimming resistors Rw1 and Rw2 is selectively laser trimmed to correct the influence of the error component.

In short, the above-described embodiment uses the analog multiplexer 6 which performs the time-divisional processing for successively detecting the sensor signal Sd, the temperature signal St, and the reference signal Sa. The differential amplification circuit 8 and the A/D conversion circuit 9 are commonly used for obtaining the digital data (pressure information D, temperature information T and reference information A) corresponding to the detected signals Sd, St and Sa. Based on the digital data thus obtained, the calculation for obtaining the pressure "P" according to the equation ⑥ is performed to compensate the temperature deviation in the sensitivity and also in the offset. Thus, it becomes possible to accurately detect a pressure value.

In this case, the pressure detecting bridge circuit 3 and the temperature detecting bridge circuit 4 can be formed on the same semiconductor chip. It becomes possible to increase the accuracy or reliability of the temperature signal St produced from the temperature detecting bridge circuit 4. The temperature compensation in the detected pressure value can be accurately performed.

Furthermore, all of the sensor signal Sd, the temperature signal St and the reference signal Sa are processed in the common analog circuit including the analog multiplexer 6, the differential amplification circuit 8 and the A/D conversion circuit 9. The sensor signal Sd, the temperature signal St and the reference signal Sa are finally converted into the pressure information D, the temperature information T, and the reference information A used for obtaining the pressure "P" according to the equation ⑥.

Using the common analog circuit for processing a plurality kinds of signals is effective to cancel any drift components of respective signals caused due to variation or fluctuation of circuit constants in the signal transmission path. The circuit will not be subjected to the aging problem in the ratio values of T/A and D/A. As a result, it becomes possible to adequately maintain the accuracy of the finally obtained pressure value for a long time.

The essential characteristics of the present invention resides in the setting of the sensor signal Sd obtained from the pressure detecting bridge circuit 3 and the temperature signal St obtained from the temperature detecting bridge circuit 4. The variation width of the sensor signal Sd in the pressure measuring range of the pressure detecting bridge circuit 3 is substantially equalized in advance with the variation width of the temperature signal St in the temperature measuring range of the temperature detecting bridge circuit 4.

This arrangement is advantageous in that the error component caused between the sensor signal Sd and the temperature signal St can be suppressed within an acceptable level even when the amplification characteristics of the differential amplification circuit 8 constituted by operational amplifiers is nonlinear. Hence, it becomes possible to reduce the error involved in the finally obtained physical sensing value.

Figure 6A:
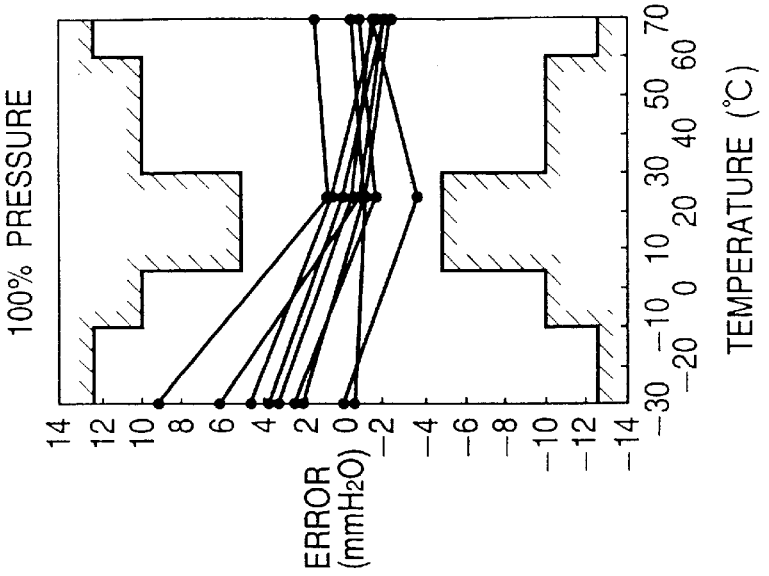
FIGS. 6A to 6C are graphs showing the measuring result of the output characteristics obtained by the semiconductor pressure sensing apparatus in accordance with the preferred embodiment of the present invention.
Figure 6B:
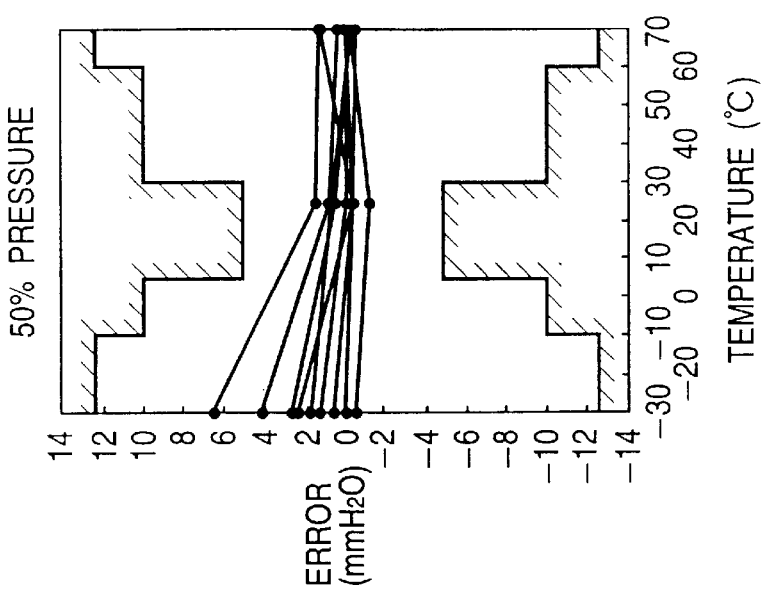
Figure 6C:
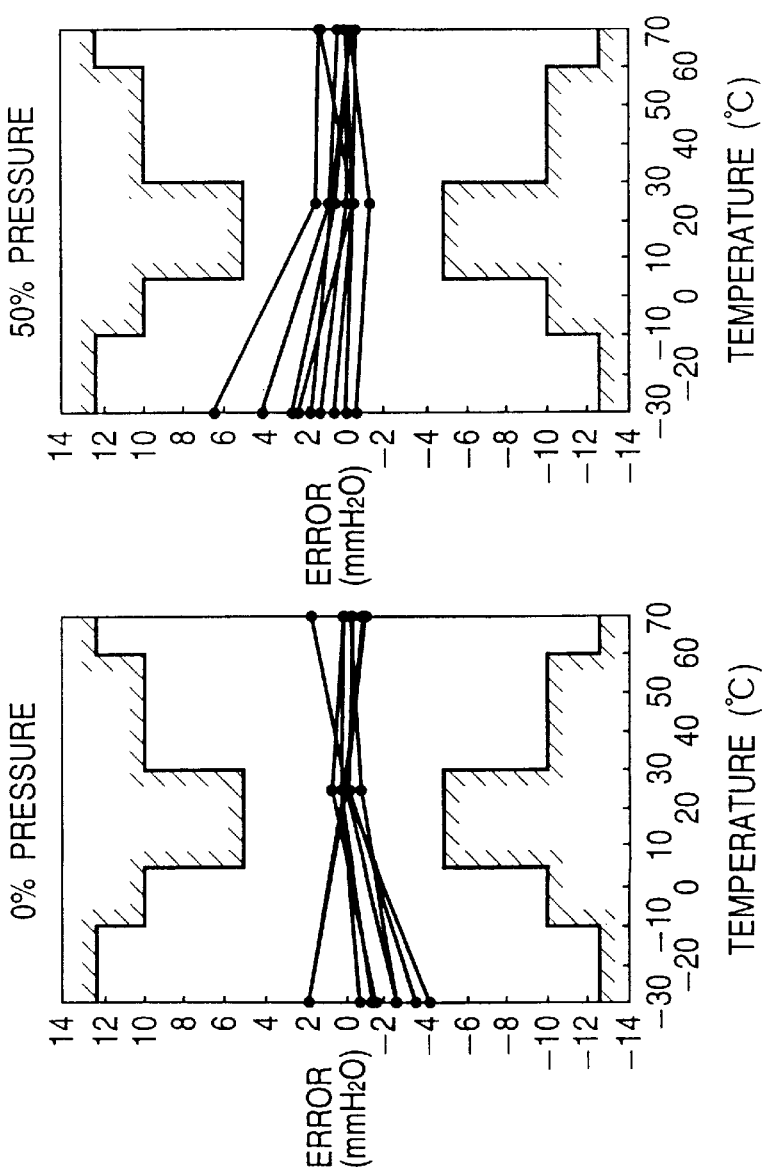

FIGS. 6A to 6C are graphs showing the measuring result of the output characteristics obtained by a plurality of samples of the semiconductor pressure sensing apparatus in accordance with the preferred embodiment of the present invention. The measuring objective pressure was selected from three levels of 0%, 50% and 100% of the maximum measurable pressure. The temperature was set to three stages of −30° C., 25° C. and 70 ° C. for the measuring operation of each objective pressure. As apparent from FIGS. 6A to 6C, the measuring result was in an allowable range in every sample.

In this case, according to the arrangement of the preferred embodiment of the present invention, the variation width of the temperature signal St obtained in the temperature detecting bridge circuit 4 is determined by adjusting the design values of the reference resistance elements Rc1 and Rc2 which are usually the same resistance values. This is advantageous in that the variation of the setting values can be suppressed appropriately.

Furthermore, the variation width of the temperature signal St is re-adjustable by using the trimming resistors Rw1 and Rw2 even after the setting of the variation width of the temperature signal St has been already finished. Accordingly, it becomes possible to accurately equalize the variation width of the sensor signal Sd and the variation width of the temperature signal St. As a result, the adverse influence of the nonlinear amplification characteristics of the differential amplification circuit 8 can be surely removed.

The above-described embodiment uses the analog multiplexer 6, and therefore does not require numerous operational amplifiers. The overall size of the circuit can be downsized. Furthermore, the differential amplification circuit 8 which occupies a relatively large area is also commonly used for amplifying the sensor signal Sd, the temperature signal St and the reference signal Sa. In other words, it is not necessary to provide numerous differential amplification circuits. This is effective to downside the overall size of the circuit.

Moreover, the above-described embodiment uses the A/D conversion circuit 9 including the ring-gate delay circuit 10. The conversion speed is greatly increased, and therefore the sampling time can be greatly reduced. As a result, the sensed pressure value can be promptly calculated within a short time.

The sensing apparatus of the present invention is not limited to a semiconductor pressure sensing apparatus. For example, the present invention can be applied to a sensing apparatus for detecting other physical quantities including acceleration, magnetic flux, and humidity. It is possible to flexibly modify the circuit arrangement of the ring-gate delay circuit 10 in the A/D conversion circuit 9. Moreover, the present invention can be applied to a sensing apparatus which is based on the analog processing circuit for performing the temperature correction for the sensitivity or the offset. The reference voltage generating circuit 5 can be removed if it is not required.

Figure 7:
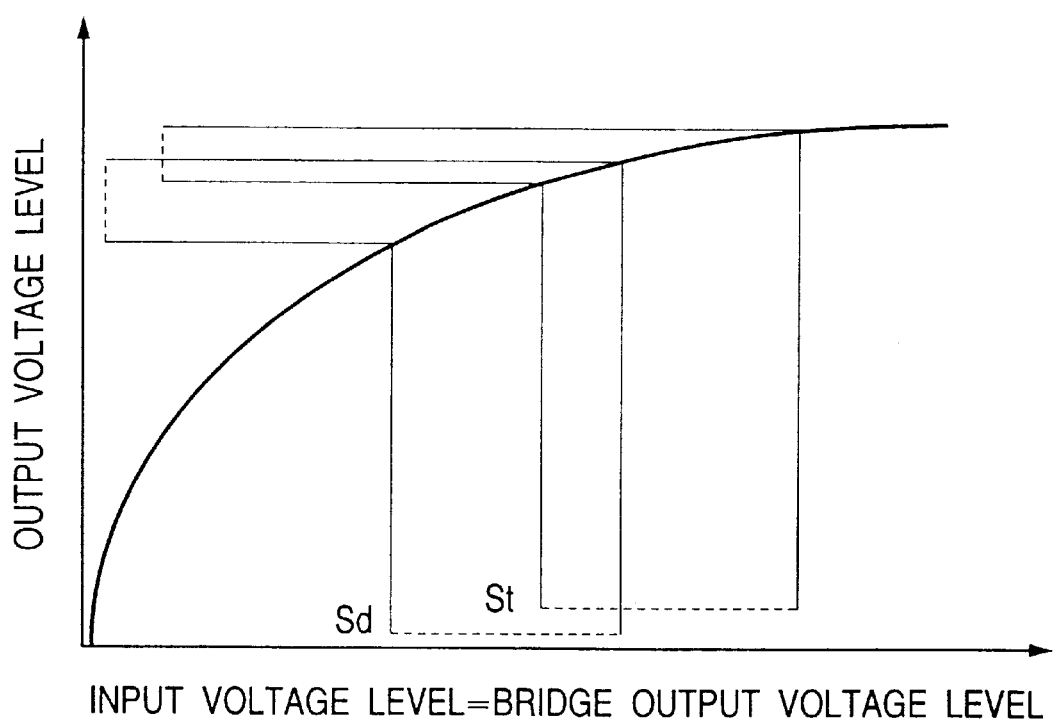
FIG. 7 is a graph showing input-output characteristics of an operational amplifier.

The sensing apparatus of the present invention is applicable to a tire or wheel pressure sensor of an automotive vehicle or to a domestic or home gas pressure sensor which receives electric power from a battery (e.g., 3V). FIG. 7 shows the input-output characteristics of an operational amplifier. When the battery voltage is small, the input-output characteristics of the operational amplifier deviates from its ideal characteristics (straight line). For example, a general operational amplifier shows such undesirable deviation when the driving voltage is less than approximately 3.5V.

Accordingly, as shown in FIG. 7, the output Sd from the pressure detecting bridge circuit possibly deviates with respect to the output St of the temperature detecting bridge circuit. Namely, both of the zero-crossing point (or zero point) value and the variation width may differ in the sensor signal and the temperature signal. The inclination in the actual characteristics line will be differentiated undesirably.

For example, the sensor has the following operational range.

Variation Width of Pressure: 0 to 350 mmH$_2$O

Variation Width of Temperature: −10 ° C. to 60 ° C.

In this case, the present invention not only equalizes the output variation widths but also equalizes the zero-crossing points between two bridge circuits.

As described above, the output variation width can be controlled by adjusting the reference resistors Rc1 and Rc2. Such an adjustment is performed in a design stage of the product. In other words, the resistance values of CrSi resistors, serving as the reference resistors Rc1 and Rc2, are adequately selected.

Meanwhile, the zero-crossing point can be controlled by adjusting the trimming resistors Rc1 and Rc2 in the temperature detecting bridge circuit 4. Such an adjustment is performed by trimming the CrSi resistors after the product is manufactured.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A sensing apparatus comprising:

a sensing bridge circuit including a plurality of resistance elements for generating a sensor signal having a voltage level responsive to a detected physical quantity;

a temperature detecting bridge circuit including at least one temperature-sensing resistance element having a predetermined temperature coefficient and at least one reference resistance element having a temperature coefficient equal to or nearly equal to 0 for generating a temperature signal having a voltage level responsive to a temperature of said sensing bridge circuit, said temperature detecting bridge circuit further including at least one trimming resistor to adjust a variation width of said temperature signal produced from the temperature detecting bridge circuit;

a signal selecting circuit for selectively outputting said sensor signal and said temperature signal; and an amplification circuit for amplifying the signals successively outputted from said signal selecting circuit;

wherein a variation width of said sensor signal in a measuring range of the detected physical quantity of said sensing bridge circuit is substantially equalized in advance with the variation width of said temperature signal in a temperature measuring range of said temperature detecting bridge circuit by means of said at least one trimming resistor.

2. The sensing apparatus in accordance with claim 1, wherein said sensing bridge circuit and said temperature detecting bridge circuit are formed on a same semiconductor substrate.

3. The sensing apparatus in accordance with claim 1, wherein the variation width of said sensor signal in the measuring range of the detected physical quantity of said sensing bridge circuit is substantially equalized with the variation width of said temperature signal in the temperature measuring range of said temperature detecting bridge circuit by adjusting a design resistance value of said at least one reference resistance element.

4. The sensing apparatus in accordance with claim 1, further comprising:

an A/D conversion circuit for converting the amplified signals of said amplification circuit into digital data corresponding to said sensor signal and said temperature signal; and signal processing means for performing digital calculating processing based on the digital data produced from said A/D conversion circuit to calculate the detected physical quantity corresponding to said sensor signal and correct the detected physical quantity in accordance with said temperature signal.

5. The sensing apparatus in accordance with claim 4, wherein said A/D conversion circuit includes a ring-gate delay circuit comprising a plurality of inverting circuits connected in a ring pattern and having an inverting operation time varying in accordance with a power source voltage, and each of said amplified signals, when serving as said power source voltage of said ring-gate delay circuit, is converted into digital data based on a pulse signal circulation frequency when a pulse signal is entered into said ring-gate delay circuit.

6. The sensing apparatus in accordance with claim 1, further comprising:

a reference voltage generating circuit for generating a reference signal having a constant voltage level irrespective of the detected physical quantity and the temperature of said sensing bridge circuit, said reference signal being selected by said signal selecting circuit and supplied to said amplification circuit;

an A/D conversion circuit for converting the amplified signals of said amplification circuit into digital data corresponding to said sensor signal, said temperature signal and said reference signal; and signal processing means for performing digital calculating processing based on the digital data produced from said A/D conversion circuit to calculate the detected physical quantity corresponding to said sensor signal and correct the detected physical quantity in accordance with said temperature signal and said reference signal.

7. The sensing apparatus in accordance with claim 6, wherein said A/D conversion circuit includes a ring-gate delay circuit comprising a plurality of inverting circuits connected in a ring pattern and having an inverting operation time varying in accordance with a power source voltage, and each of said amplified signals, when serving as said power source voltage of said ring-gate delay circuit, is converted into digital data based on a pulse signal circulation frequency when a pulse signal is entered into said ring-gate delay circuit.

8. The sensing apparatus in accordance with claim 1, wherein a zero-crossing point of said sensor signal in the measuring range of detected physical quantity of said sensing bridge circuit is substantially equalized in advance with a zero-crossing point of said temperature signal in the temperature measuring range of said temperature detecting bridge circuit.

9. The sensing apparatus in accordance with claim 8, wherein said temperature detecting bridge circuit has at least one trimming resistor to adjust the zero-crossing point of said temperature signal produced from said temperature detecting bridge circuit.

10. The sensing apparatus in accordance with claim 1, wherein a power source for supplying electric power to said sensing apparatus is a battery.

11. The sensing apparatus in accordance with claim 1, wherein said at least one temperature-sensing resistance element of said temperature detecting bridge circuit is a pair of temperature-sensitive resistors, said at least one reference resistance element of said temperature detecting bridge circuit is a pair of temperature-insensitive resistors, said pair of temperature-sensitive resistors and said pair of temperature-insensitive resistors are connected in a bridge pattern, and said pair of temperature-insensitive resistors having an adjustable resistance value, wherein the adjustable resistance value is adjusted to adjust the variation width of the temperature signal.

12. The sensing apparatus in accordance with claim 11 wherein at least one trimming resistor is connected in series with said pair of temperature-sensitive resistors and said pair of temperature-insensitive resistors, and said trimming resistor being configured to adjust a zero-crossing point of the temperature signal.

13. A method of adjusting temperature characteristics of a sensing apparatus, said sensing apparatus comprising:

a sensing bridge circuit including a plurality of resistance elements for generating a sensor signal having a voltage level responsive to a detected physical quantity;

a temperature detecting bridge circuit including at least one temperature-sensing resistance element having a predetermined temperature coefficient and at least one reference resistance element having a temperature coefficient equal to or nearly equal to 0 for generating a temperature signal having a voltage level responsive to a temperature of said sensing bridge circuit, said temperature detecting bridge circuit further including at least one trimming resistor to adjust a variation width of said temperature signal produced from the temperature detecting bridge circuit; and a signal selecting circuit for selectively outputting said sensor signal and said temperature signal;

said method comprising:

substantially equalizing a variation width of said sensor signal in a measuring range of the detected physical quantity of said sensing bridge circuit with a variation width of said temperature signal in a temperature measuring range of said temperature detecting bridge circuit by means of trimming at least one trimming resistor provided in said temperature detecting bridge circuit.

14. The method in accordance with claim 12, wherein the variation width of said sensor signal in the physical quantity measuring range of said sensing bridge circuit is substantially equalized with the variation width of said temperature signal in the temperature measuring range of said temperature detecting bridge circuit by adjusting a design resistance value of said at least one reference resistance element.

15. The method in accordance with claim 13, further comprising:

substantially equalizing a zero-crossing point of said sensor signal in the measuring range of the detected physical quantity of said sensing bridge circuit with a zero-crossing point of said temperature signal in the temperature measuring range of said temperature detecting bridge circuit.

16. The method in accordance with claim 15, wherein the zero-point of said temperature signal produced from said temperature detecting bridge circuit is controlled by trimming at least one trimming resistor provided in said temperature detecting bridge circuit.

* * * * *